United States Patent
Akagi et al.

(10) Patent No.: US 10,712,188 B2
(45) Date of Patent: Jul. 14, 2020

(54) FLOW MEASURING DEVICE

(71) Applicant: Mitsubishi Electric Corporation, Tokyo (JP)

(72) Inventors: Kazuto Akagi, Tokyo (JP); Yuji Ariyoshi, Tokyo (JP); Masahiro Kawai, Tokyo (JP); Naoyuki Kishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 212 days.

(21) Appl. No.: 15/877,435

(22) Filed: Jan. 23, 2018

(65) Prior Publication Data
US 2019/0107421 A1   Apr. 11, 2019

(30) Foreign Application Priority Data
Oct. 5, 2017  (JP) ................................ 2017-194855

(51) Int. Cl.
*G01F 1/684* (2006.01)
*G01F 1/692* (2006.01)
*G01F 15/14* (2006.01)

(52) U.S. Cl.
CPC .......... *G01F 1/6842* (2013.01); *G01F 1/6845* (2013.01); *G01F 1/692* (2013.01); *G01F 15/14* (2013.01)

(58) Field of Classification Search
CPC ....... G01F 1/6842; G01F 1/6845; G01F 1/692
USPC ....................................... 73/202.5
See application file for complete search history.

(56) References Cited

U.S. PATENT DOCUMENTS

| | | | | |
|---|---|---|---|---|
| 5,396,795 A * | 3/1995 | Araki | ................ | G01F 1/684 257/E21.504 |
| 6,393,907 B1 * | 5/2002 | Yamakawa | ............ | G01F 1/684 73/204.26 |
| 6,820,479 B2 * | 11/2004 | Roeckel | ............... | G01F 1/6842 374/E13.006 |
| 7,150,189 B2 * | 12/2006 | Tanaka | ................ | G01F 1/6845 73/204.26 |
| 7,437,927 B2 * | 10/2008 | Yamada | ............... | G01F 1/6842 73/204.21 |

(Continued)

FOREIGN PATENT DOCUMENTS

| | | |
|---|---|---|
| JP | 07012940 U | 3/1995 |
| JP | 2012103078 A | 5/2012 |
| JP | 5197714 B2 | 5/2013 |

OTHER PUBLICATIONS

Communication dated Jun. 19, 2018, from the Japanese Patent Office in counterpart application No. 2017-194855.

*Primary Examiner* — Nathaniel T Woodward
(74) *Attorney, Agent, or Firm* — Sughrue Mion, PLLC; Richard C. Turner

(57) ABSTRACT

Provide a flow measuring device which inhibits a reduction of flow detection accuracy, which is caused by an influence of a bottom flow which is flowed and inputted from a fit gap between a flow detecting element and an installing portion of the flow detecting element. A concave portion, which inhibits an influence of a bottom flow which is flowed and inputted from a fit gap between an installing portion and a flow detecting element, is provided at a bottom surface of the installing portion of a plate which is positioned on a projected area of a cavity of the flow detecting element.

7 Claims, 17 Drawing Sheets

(56) References Cited

U.S. PATENT DOCUMENTS

| | | | | |
|---|---|---|---|---|
| 7,640,798 B2* | 1/2010 | Oda | ............... | G01F 1/6845 |
| | | | | 73/204.26 |
| 8,220,326 B2* | 7/2012 | Hidaka | ............ | G01F 1/692 |
| | | | | 73/204.26 |
| 8,640,538 B2* | 2/2014 | Kono | ............. | G01F 1/6845 |
| | | | | 73/204.26 |
| 8,736,002 B2* | 5/2014 | Graf | ............... | H01L 24/10 |
| | | | | 257/414 |
| 9,523,595 B2* | 12/2016 | Ishitsuka | ............ | G01F 5/00 |
| 9,952,080 B2* | 4/2018 | Kono | ............. | G01F 1/6845 |
| 2006/0075815 A1* | 4/2006 | Tanaka | ............ | G01F 1/6845 |
| | | | | 73/204.26 |
| 2007/0022808 A1* | 2/2007 | Tanaka | ............ | G01F 1/6845 |
| | | | | 73/170.09 |
| 2008/0053215 A1* | 3/2008 | Yamada | .......... | G01F 1/6842 |
| | | | | 73/204.21 |
| 2012/0103087 A1 | 5/2012 | Nakanishi et al. | | |

* cited by examiner

FLOW MEASURING DEVICE

BACKGROUND OF THE INVENTION

Field of the Invention

The present invention relates to a flow measuring device, and relates to a device which measures an air mass flow of, for example, an internal combustion engine.

Background Art

As a flow measuring device which is mounted at an intake air pipeline of an internal combustion engine and measures a flow of inhalation air, a thermal-type flow measuring device is used.

In a general thermal-type flow measuring device, a measuring passage (hereinafter, referred to as a bypass passage), in which a part of inhalation air is inputted, is formed, and a flow detecting element is disposed in the bypass passage.

In the general thermal-type flow measuring device, the bypass passage is formed in such a way that a plurality of components (mold components are mainly adopted) are fitted, and an installing portion having a concave shape, by which the flow detecting element is mounted, is provided in one component in the plurality of components (hereinafter, a component, which is used as a supporting component which includes the installing portion is referred to as a plate, and a component, which is fitted to the plate, is referred to as a cover).

The flow detecting element has a plate shape, and a semiconductor element, in which a part of the flow detecting element is partly removed and a flow detecting portion, which is configured by using a thin-walled portion which is composed of a few micron thin film, is included, is used (hereinafter, an area, which is excepted from the flow detecting portion (or referred to as a thin film portion or a thin-walled portion) is referred to as a thick film portion or a thick-walled portion). The thermal-type flow measuring device measures a flow of a measured fluid by using that an amount of heat, which is lost from the flow detecting portion by the measured fluid, has flow dependence.

In addition, the flow detecting portion is formed as a thin film portion (a thin-walled portion), because air is provided in a cavity portion (hereinafter, the cavity portion is referred to as a cavity) which is positioned directly below the flow detecting portion and a heat insulation is performed, whereby an extra heat transmission, which becomes an error factor, to a plate is prevented.

The installing portion of the plate and the flow detecting element are generally fixed by using an adhesive.

However, when all area of the thick film portion around the flow detecting portion at the flow detecting element is bonded to the plate, air, which exists in the cavity, is blocked, so that a temperature valuation is caused, and when the air is expanded and constricted, a load is caused to the flow detecting portion. As a result, detection accuracy is worsened, and the flow detecting portion is broken in the worst case.

Therefore, the flow detecting element is fixed to the installing portion of the plate in such a way that a gap is partly caused between fit surfaces of a thick film portion, which is provided at neighborhood of an area of the flow detecting portion, and the installing portion of the plate.

Hereinafter, a problem of the flow measuring device, which has the above-described configuration, will be explained.

In the flow measuring device which has the above-described configuration, there is a known problem in which a measured fluid is passed through a gap (hereinafter, referred to as a fit gap) which is provided between the fit surfaces of a plate installing portion which exists around the flow detecting portion and the flow detecting element, and the measured fluid is flowed and inputted to the cavity, whereby detection accuracy is greatly lowered (hereinafter, the above-described flow is referred to as a bottom flow). In other words, although the flow measuring device considers only an amount of heat which is lost from a measured fluid which is flowed on a surface of the flow detecting portion, and calculates a flow, when the bottom flow is caused, an amount of heat is lost by the measured fluid from a back surface of the flow detecting portion (an amount of heat is lost from a flow which is excepted from an estimated flow), whereby the detection accuracy is greatly worsened. Therefore, in a conventional flow measuring device, which is indicated in, for example, Patent Document 1, a countermeasure, which is described in the following description, by which a bottom flow is prevented, is performed.

In the measuring device which is described in Patent Document 1, an adhesive, which is referred to as a bottom flow inhibitor, is coated at the fit surfaces of the flow detecting portion and the plate installing portion, and a fit gap is filled. As a result, an inflow of a bottom flow, which is flowed in the fit gap, is inhibited, and the bottom flow is not cased, whereby it is prevented that detection accuracy is lowered.

[Patent Document 1]

Japanese Patent Publication No. 5197714

However, when the countermeasure, which is described in Patent Document 1, is performed, it has been difficult that an influence of a bottom flow is inhibited. As a background of the countermeasure, it is cited that "a miniaturization" is planned in order to reduce a cost and in order to reduce a smash probability, toward a flow detecting element, of dust, which is flying and coming in a pipeline, or a resolution capability to a flow is improved in order to expand a measurement flow area (referred to as "realizing for a high sensitivity"). Each of influences will be explained in the following descriptions.

The "a miniaturization" of the flow detecting element is realized, whereby an area, at which a thick film portion around a flow detecting portion and a plate installing portion are fitted, is reduced. Therefore, when a bottom flow inhibitor, of which amount of a coating is equivalent to a conventional amount of a coating, is coated, the bottom flow inhibitor is protruded from the thick film portion and rises to the flow detecting portion, and the bottom flow inhibitor is bonded. As a result, a heat transmission is caused at the flow detecting portion and the bottom flow inhibitor, and detection accuracy is reduced.

Moreover, in order to prevent a protrusion of the bottom flow inhibitor, although it is required that an amount of a coating is reduced, it is required that the amount of the coating of the bottom flow inhibitor is greatly reduced, by using "a miniaturization", in comparison with a conventional amount of a coating of a bottom flow inhibitor. When the bottom flow inhibitor is coated in a state where the amount of the coating is reduced, there is a case in which a coating interruption of the bottom flow inhibitor is caused in a coating fluctuation, and the bottom flow is flowed and inputted from an interrupted portion, whereby a problem, in which output accuracy is reduced, is caused.

Moreover, the "realizing for a high sensitivity" of the flow detecting element is realized, whereby an influence is caused to the detection accuracy of the flow even when a minute bottom flow, for which an influence of the "realizing for a high sensitivity" can be ignored in a conventional flow detecting element, is flowed. As described above, the bottom flow inhibitor cannot be coated at all area of the thick film portion around the flow detecting portion, so that the output accuracy is influenced even when a few bottom flow, which is flowed and inputted from a portion on which the bottom flow inhibitor is not coated, is flowed.

As described above, an influence of the bottom flow cannot be sufficiently inhibited when a conventional countermeasure and a method is used.

SUMMARY OF THE INVENTION

As described above, an influence of a bottom flow cannot be sufficiently inhibited by using a conventional countermeasure and a method. Therefore, the present invention has been made to solve the above-described problems, and an object of the invention is to provide a flow measuring device in which an influence of a bottom flow can be inhibited and a reduction of detection accuracy can be prevented.

In a flow measuring device of the present invention, a concave portion, which inhibits a bottom flow which is flowed and inputted from a fit gap between an installing portion of a supporting component and a flow detecting element, is provided at a bottom surface of the installing portion of the supporting component, which is faced to a cavity portion of the flow detecting element.

According to the flow measuring device of the present invention, even when a bottom flow is flowed and inputted from a fit gap between a flow detecting element and an installing portion of a supporting component, a reduction of a flow velocity of the bottom flow and a flow direction of the bottom flow are controlled, whereby an influence of the bottom flow can be inhibited and a reduction of detection accuracy can be prevented.

DETAILED EXPLANATION FOR THE INVENTION

Hereinafter, suitable embodiments of a flow measuring device of the present invention will be explained in reference to drawings.

In addition, the flow measuring device, which is indicated in the present invention, is used for measuring a flow of a measured fluid which is flowed in an intake air pipeline, and the flow measuring device is used for measuring a flow of air which is flowed in an intake air pipeline of, for example, an internal combustion engine.

Embodiment 1

Figure 1:
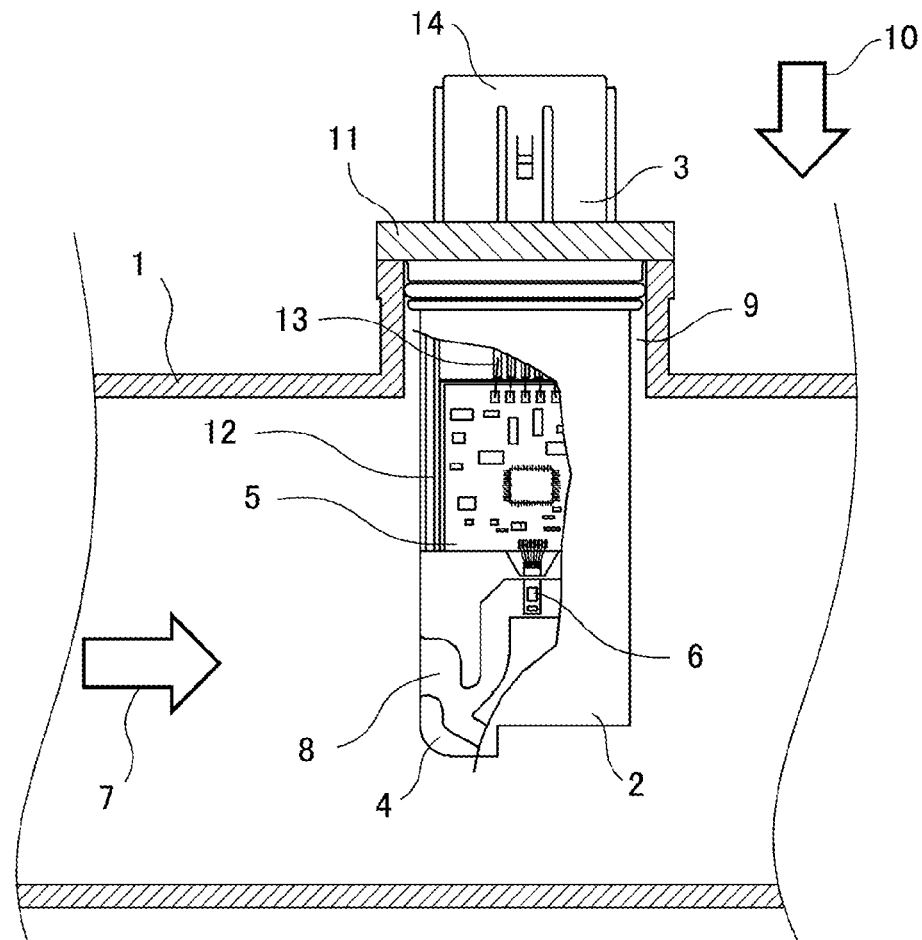
FIG. 1 is a front view in which a part of a flow measuring device according to Embodiment 1 of the present invention is cut out and indicated.

FIG. 1 is a front view in which a part of a flow measuring device according to Embodiment 1 of the present invention is cut out and indicated.

The flow measuring device, which is attached to an intake air pipeline 1 which is used as a main passage, is composed of components which are a cover 2, a base 3, a plate 4 which is used as a supporting component, a circuit board 5 which composes a control circuit, and a flow detecting element 6, moreover, the plate 4 is provided at the intake air pipeline 1 (main passage), and the cover 2 and the plate 4 are attached by using an adhesive or the like, whereby a bypass passage 8, which inputs a part of inhalation air 7 which is a measured fluid which is flowed in the intake air pipeline 1 in an arrow direction, is formed. The control circuit, which is composed of the circuit board 5, drives the flow detecting element 6, and the control circuit processes a signal of the flow detecting element 6.

For example, a PBT resin or the like is used for a material of the cover 2, the base 3, and the plate 4.

In the following explanation, "upstream side" will indicate an upstream side of the inhalation air 7 which is faced and flowed to an arrow direction, and "downstream side" will indicate a downstream side of the inhalation air 7 which is faced and flowed to the arrow direction.

A through hole 9, by which the flow measuring device is attached, is provided at the intake air pipeline 1, and the flow measuring device is inserted from the outside of the intake air pipeline 1 to a direction which is indicated by an arrow 10, and a flange 11 of the base 3 is fixed by using a screw (which is not illustrated) or the like, whereby the flow measuring device is attached to the intake air pipeline 1.

The circuit board 5 is bonded to a case 12 of the base 3 by using an adhesive or the like, whereby the circuit board 5 is supported and installed, and the circuit board 5 is electrically connected to the base 3 by using a wire bonding 13. A flow signal, which is processed by the circuit board 5, is given to and received from the outside via a connector 14 of the base 3. Moreover, a voltage, by which the flow measuring device is driven, is also supplied via the connector 14.

Figure 2:
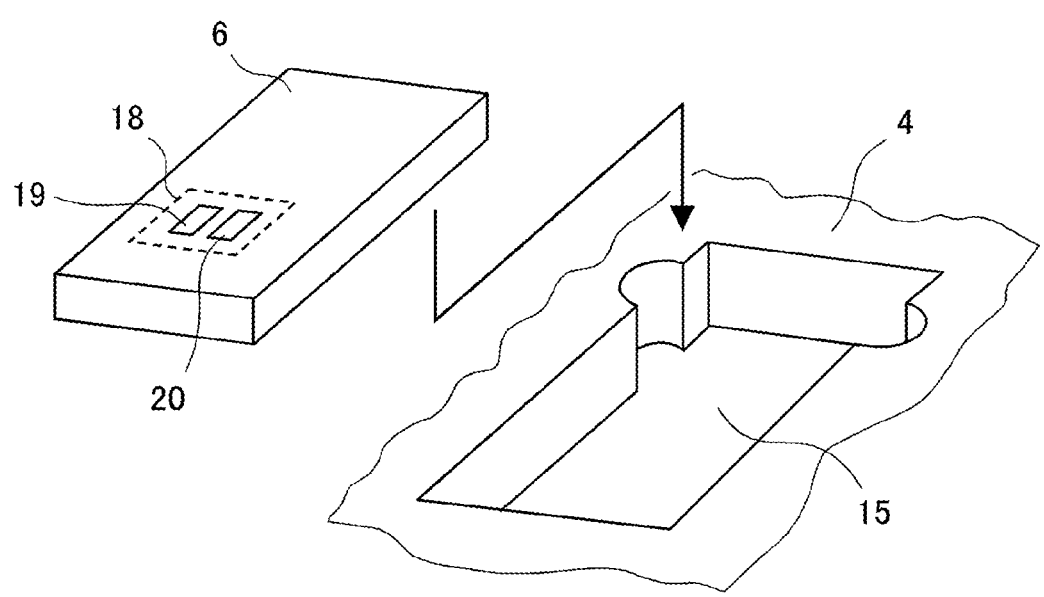
FIG. 2 is a schematic oblique perspective view for explaining a fit method for a flow detecting element and an installing portion of a plate.
Figure 3:
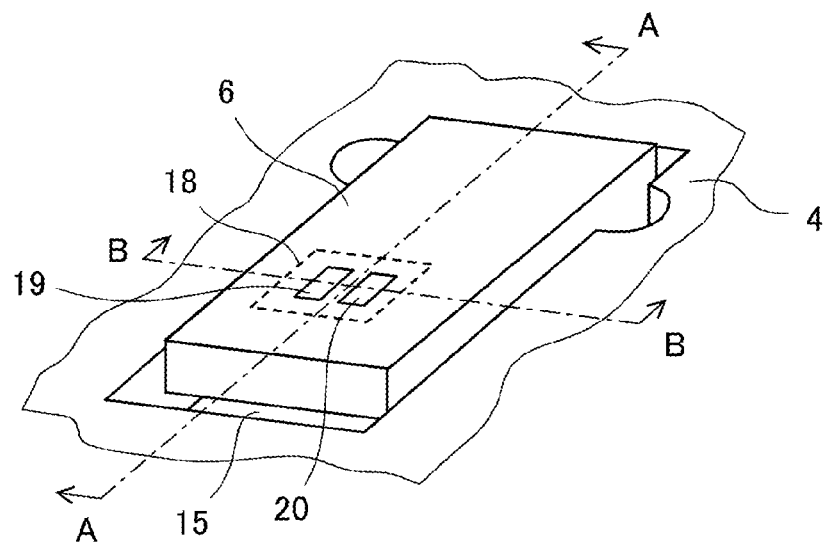
FIG. 3 is an oblique perspective view which indicates a fit state for the flow detecting element and the installing portion of a plate.
Figure 4:
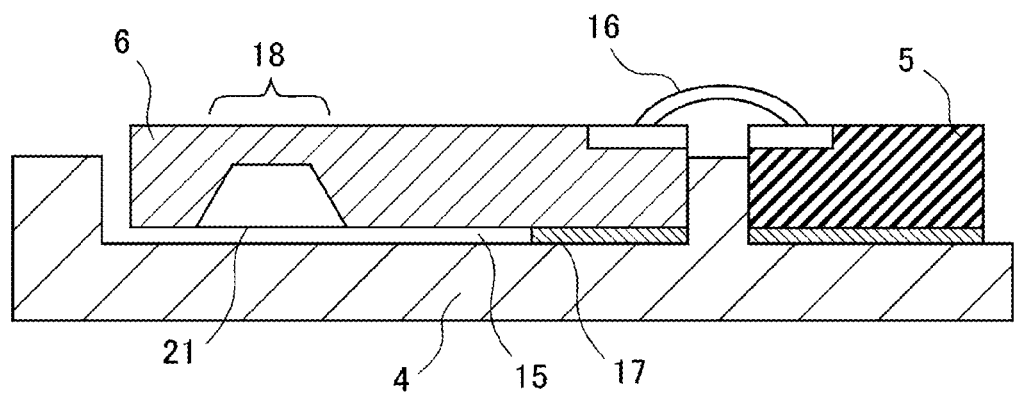
FIG. 4 is a cross-sectional view in which a cross section along "A-A" line in FIG. 3 is indicated.
Figure 5:
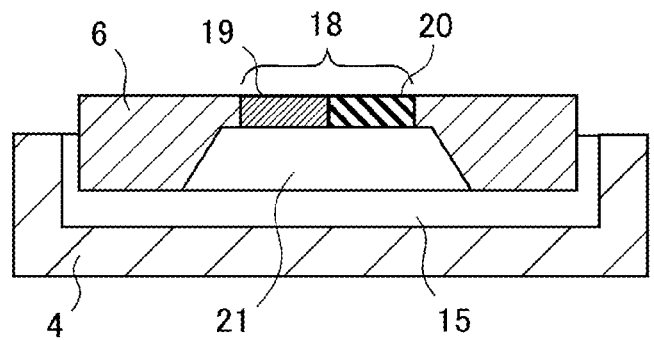
FIG. 5 is a cross-sectional view in which a cross section along "B-B" line in FIG. 3 is indicated.

As illustrated in FIG. 2, an installing portion (or referred to as a plate installing portion) 15 having a concave shape, by which the flow detecting element 6 is mounted, is formed at the plate 4. FIG. 3 indicates a state in which the flow detecting element 6 is fitted and arranged so as to be installed to the installing portion 15. FIG. 4 is a cross-sectional view in which a cross section along "A-A" line in FIG. 3 is indicated, and FIG. 5 is a cross-sectional view in which a cross section along "B-B" line in FIG. 3 is indicated. As illustrated in FIG. 4, an adhesive 17 is coated on a part of the installing portion 15, and the flow detecting element 6 and the installing portion 15 are bonded in such a way that a thick film portion of the flow detecting element 6 and a bottom surface of the installing portion 15 of the plate 4 are fitted.

The flow detecting element 6 is electrically connected to the circuit board 5 by using a wire bonding 16.

The circuit board 5 performs a control operation in such a way that a temperature of the flow detecting element 6 is set as a constant temperature, and when an amount of heat of the flow detecting element 6 is lost by a measured fluid, a flow signal is calculated in reference to a consumption electric current value which is required for warming the flow detecting element 6 until the flow detecting element 6 is set at a constant temperature.

Moreover, the semiconductor-type flow detecting element 6 is a component at which a thin-walled portion (a thin film portion) is formed by performing an etching process on a back surface of a base material, which is composed of an insulating plate which is made of silicon, polysilicon, ceramic or the like, and a flow detecting portion 18, which is composed of a flow detecting resistor and a temperature compensating resistor, is formed at the thin-walled portion. An area being excepted from the thin-walled portion is referred to as a thick film portion (a thick-walled portion) (the area is similarly referred to as a thick film portion in the following description).

At the flow detecting resistor, as illustrated in FIG. 5, an upstream-side flow detecting resistor 19 and a downstream-side flow detecting resistor 20 are disposed on a surface of the base material. The upstream-side flow detecting resistor 19 and the downstream-side flow detecting resistor 20 are disposed in order to detect a pulsing flow which is caused in an internal combustion engine, and a flow direction of inhalation air is estimated in accordance with a losing method for an amount of heat of each of the resistors, and a net amount of the inhalation air, which is faced to a power unit, is calculated. When the pulsing flow is caused, there is a case in which the inhalation air is flowed from a downstream side to an upstream side.

Moreover, the flow detecting portion 18 is formed as the thin-walled portion in order to maintain air in a cavity 21 at a lower portion (a back surface) of the flow detecting portion 18 which is indicated in FIG. 4, when the flow detecting portion 18 is bonded to the installing portion 15, and in order to prevent a heat transmission to the plate 4, which becomes a cause of an error. At the flow detecting element 6, a heat capacity of a heating resistor is small, and a heat insulating capability to the plate is excellent, so that the flow detecting element 6 has a low power consumption capability and a high-speed response capability. In addition, the cavity 21 is formed by partly removing a lower portion of a base material, and the cavity 21 is formed in a tapered shape which includes an inclined surface in a state where an inner surface is expanded toward the lower portion.

Figure 6:
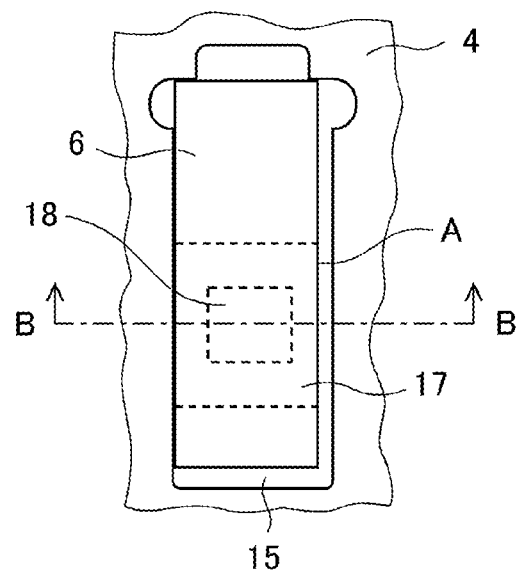
FIG. 6 is a front view of a flow detecting element portion for explaining a problem which is caused when a flow detecting portion is blocked.
Figure 7:
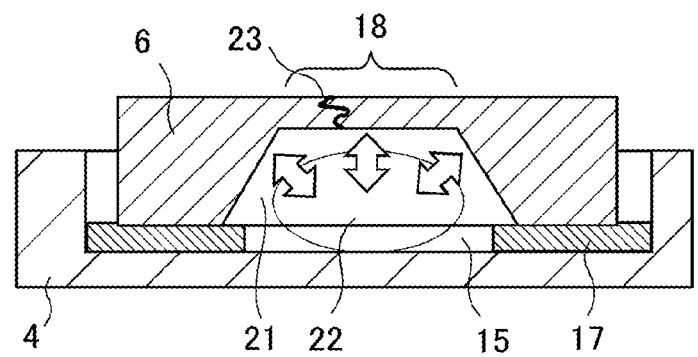
FIG. 7 is a cross-sectional view in which a cross section along "B-B" line in FIG. 6 is indicated.

FIG. 6 is a front view of the flow detecting element portion 18 for explaining a problem which is caused when the flow detecting portion 18 is blocked. FIG. 7 is a cross-sectional view in which a cross section along "B-B" line in FIG. 6 is indicated.

In a case in which the flow detecting element 6 and the plate installing portion 15 are bonded, when all area of a thick film portion of a neighborhood of the flow detecting portion 18, which is indicated in a "A" portion in FIG. 6, is bonded to the plate installing portion 15, and when a temperature variation is caused as illustrated in FIG. 7, air 22, which is blocked in the cavity 21, is expanded and constricted, whereby a load is caused toward the flow detecting portion 18. As a result, a crack 23 is caused at the flow detecting portion 18, and there is a problem in which the flow detecting portion 18 is broken, so that the flow detecting element 6 is bonded to the plate installing portion 15 in such a way that a gap is partly produced between fit surfaces of the plate installing portion 15 and the flow detecting element 6.

However, at the flow measuring device, which is configured as described above, in which the gap is partly produced between the fit surfaces of the plate installing portion 15 and the flow detecting element 6, and in an area in which a flow of the inhalation air 7 is high, the inhalation air 7 is flowed and inputted from a fit gap between the plate installing portion 15 and the flow detecting element 6 to the cavity 21 and a bottom flow is caused, so that there is a problem in which detection accuracy is lowered.

Figure 8:
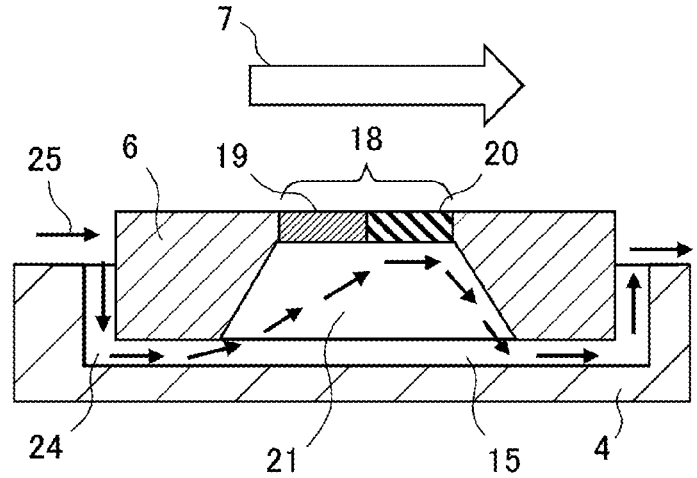
FIG. 8 is a cross-sectional view of the flow detecting element portion for explaining a locus of a bottom flow which is flowed and inputted to a cavity.
Figure 9:
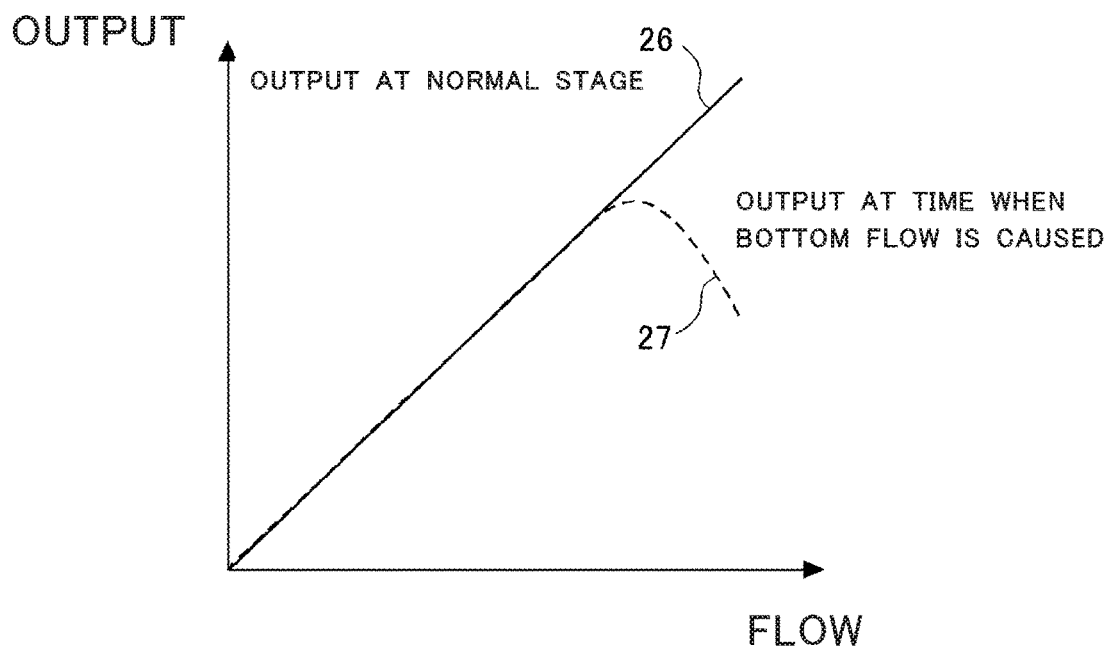
FIG. 9 is a view for explaining a relation between a flow of a measured fluid and an output of the flow measuring device when the bottom flow is caused.

Hereinafter, a mechanism of a reduction of the detection accuracy, which is caused by the bottom flow, will be explained. FIG. 8 indicates a locus of the bottom flow, which is flowed and inputted to the cavity 21, by using arrows. The bottom flow is passed through a side surface between the flow detecting element 6 and the plate installing portion 15, and through a fit gap 24 which is produced at a bottom surface, and the bottom flow is flowed and inputted to the cavity 21. An exfoliation is caused while a cross-sectional area is varied from a thick film portion of the flow detecting element 6 to a thin-walled portion, so that a bottom flow 25, which is flowed and inputted to the cavity 21, is flowed in a state where a flow direction of the bottom flow 25 is faced to the downstream-side flow detecting resistor 20. The bottom flow 25 is caused, whereby heat of the downstream-side flow detecting resistor 20 is lost from a flow of the inhalation air 7 which is flowed at a front side of the flow detecting portion 18, and is lost from the bottom flow 25. As described above, the flow measuring device detects the flow direction of the inhalation air 7 in accordance with the losing method for the amount of the heat, by the inhalation air 7, of each of the flow detecting resistors, so that much amount of heat of the downstream-side flow detecting resistor 20 is lost with respect to the upstream-side flow detecting resistor 19, whereby the flow measuring device performs an error decision in which a pulsing flow is caused, and an error correction is multiplied to a flow signal. As a result, as illustrated in FIG. 9, an output is not simply increased with respect to a flow of a measured fluid, and detection accuracy is greatly lowered. FIG. 9 is a characteristic view which indicates a relation between the flow of the measured fluid and the output of the flow measuring device when the bottom flow is caused, and FIG. 9 indicates characteristics of an output 26 at a normal state and an output 27 at a time when the bottom flow is caused.

Therefore, as a conventional countermeasure method, a configuration, which is indicated in, for example, Patent Document 1, in which an adhesive, which is referred to as a bottom flow inhibitor, is filled between the fit surfaces of the plate installing portion 15 and the flow detecting element 6 and an influence of a bottom flow is prevented, is suggested. The bottom flow inhibitor is filled between the fit surfaces of the plate installing portion 15 and the flow detecting element 6, whereby it is prevented that the bottom flow is flowed and inputted, and it is inhibited that detection accuracy is lowered. Moreover, a back surface of the flow detecting element 6 is formed in a convex-concave shape, whereby the conventional countermeasure method has a configuration in which a protrusion of the bottom flow inhibitor is prevented by an expansion effect of a surface area.

However, it has been difficult that an influence of the bottom flow is inhibited by the countermeasure which is described in Patent Document 1. As a background of the countermeasure, in the flow detecting element 6, it is listed that "a miniaturization" of the flow detecting element 6 is planned in order to reduce a cost and in order to lower a probability of an impact, of dust which is flying and coming in a pipeline, toward the flow detecting element 6, moreover, in order to expand a region of a measured flow, a disassemble capability with respect to a flow is improved (high sensitivity is realized).

Figure 10:
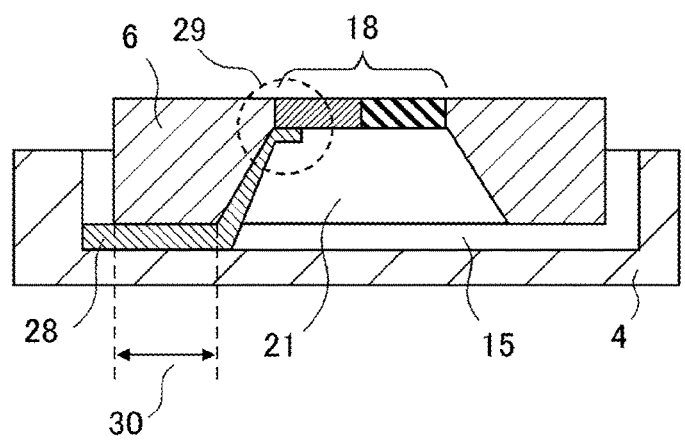
FIG. 10 is a schematic cross-sectional view for explaining a problem which is caused at the flow detecting portion of the flow measuring device.
Figure 11:
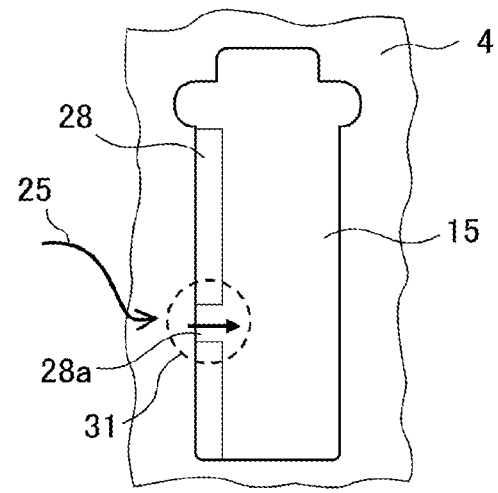
FIG. 11 is a schematic front view for explaining a problem which is caused at the flow detecting portion of the flow measuring device.

Firstly, a miniaturization of the flow detecting element 6 is advanced, whereby a fit area of the plate installing portion 15 and the flow detecting element 6 is reduced. As a result, when a bottom flow inhibitor is coated in accordance with a coating amount which is equivalent to a conventional coating amount, a bottom flow inhibitor 28 rises to the flow detecting portion 18 as illustrated in FIG. 10, and the bottom flow inhibitor 28 is bonded to the flow detecting portion 18. As indicated in a broken line circular part 29, when the bottom flow inhibitor 28 is bonded to the flow detecting portion 18, a heat transmission is caused between the flow detecting portion 18 and the bottom flow inhibitor 28, so that detection accuracy is lowered, and when a temperature valuation is caused, a load is caused to the flow detecting portion 18 in accordance with a volume valuation of the bottom flow inhibitor 28, and there is a caused fear in which the flow detecting portion 18 is broken. On the other hand, in order to prevent that the bottom flow inhibitor 28 rises, because a fit area (in particular, a thick film portion 30 around the flow detecting portion 18 which is formed as a thin-walled portion) of the plate installing portion 15 and the flow detecting element 6 is small as described above, it is required that an amount of a coating is greatly reduced. When the amount of the coating is reduced and when a fluctuation of the coating is caused, there is a case in which an interruption area 28*a* of the coating is caused as illustrated in FIG. 11, and a bottom flow invades from the interruption area 28*a*, whereby a problem, in which the detection accuracy is lowered, is caused.

Figure 12:
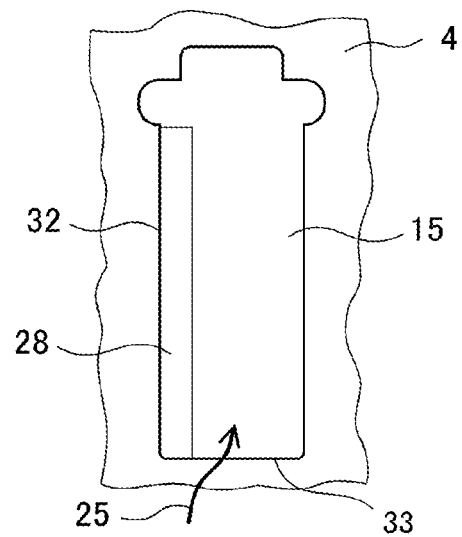
FIG. 12 is a schematic front view for explaining a problem which is caused at the flow detecting portion of the flow measuring device.

Moreover, as described above, although the thick film portion 30, which is formed around the flow detecting portion 18, is bonded in such a way that a gap is partly caused between the fit surfaces of the plate installing portion 15 and the flow detecting portion 18, when the bottom flow inhibitor 28 is coated, without an interruption, at an upstream side 32 of the plate installing portion 15, for example, as indicated in FIG. 12, although an amount of an inflow to the cavity 21 is set as a few amount of an inflow in comparison with an inflow amount at the upstream side 32, a bottom flow is also flowed and inputted from a tip side 33. It is advanced that a high sensitivity of the flow detecting element 6 is advanced, whereby an influence of an amount of heat which is lost from the flow detecting element 6, cannot be ignored even when a bottom flow having a few amount of an inflow is caused.

Therefore, a shape of and an effect of the plate installing portion 15 according to Embodiment 1, by which these problems can be solved, will be explained. In addition, a basic configuration of the flow detecting element 6 is similar to the configuration which is explained in reference to FIG. 2 through FIG. 5.

Figure 13:
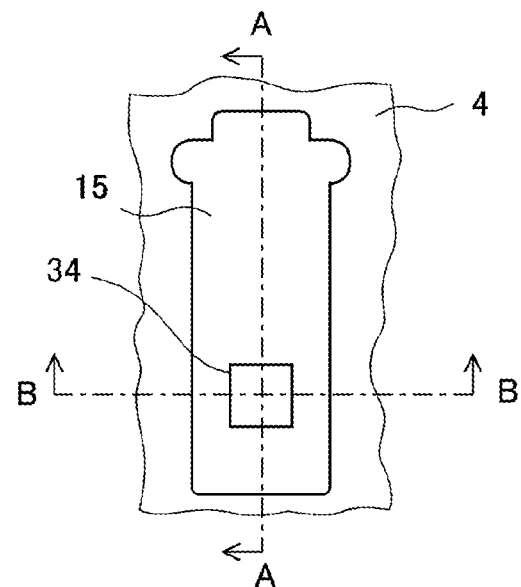
FIG. 13 is a front view which indicates the installing portion which is provided at the plate of the flow measuring device according to Embodiment 1 of the present invention.
Figure 14:
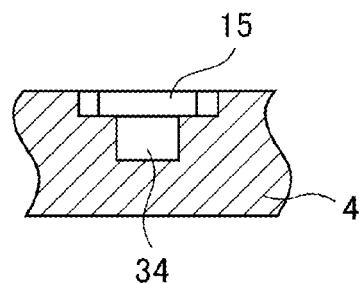
FIG. 14 is a cross-sectional view in which a cross section along "B-B" line in FIG. 13 is indicated.
Figure 15:
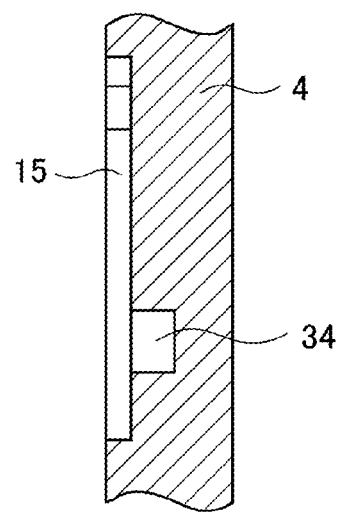
FIG. 15 is a cross-sectional view in which a cross section along "A-A" line in FIG. 13 is indicated.

FIG. 13 is a front view which indicates the plate installing portion 15 according to Embodiment 1. Moreover, FIG. 14 is a cross-sectional view in which a cross section along "B-B" line in FIG. 13 is indicated, and FIG. 15 is a cross-sectional view in which a cross section along "A-A" line in FIG. 13 is indicated. The plate installing portion 15 of the plate 4 has the outside shape in which the whole of the flow detecting element 6 is installed, and the flow detecting element 6 is mounted in such a way that a thick film portion of the flow detecting element 6 is touched to a bottom surface of the plate installing portion 15. Moreover, a concave portion 34 (hereinafter, the concave portion is referred to as a bottom flow inhibition concave portion) is more provided at a bottom surface of the plate installing portion 15, which is a fit surface between the plate installing portion 15 and the flow detecting element 6, in a state where the concave portion 34 is faced to the cavity 21, and the plate installing portion 15 has a characteristic in which the bottom flow inhibition concave portion 34 is positioned on a projected surface of the cavity 21 which is positioned directly below the flow detecting portion 18.

Hereinafter, an effect of the flow measuring device according to Embodiment 1 will be explained. In the flow measuring device according to Embodiment 1, even when a bottom flow is flowed and inputted to the cavity 21, an influence of a reduction of detection accuracy, which is caused when an amount of heat is lost from the flow detecting portion 18 by the bottom flow, can be inhibited in accordance with "a reduction effect of a flow velocity (an amount of a flow) of a bottom flow", which is obtained when a cross-sectional area of a passage, in which the bottom flow is passed, is expanded at the bottom flow inhibition concave portion 34, and in accordance with "a control effect of a flow direction of a bottom flow", which is obtained when an eddy is caused in the bottom flow inhibition concave portion 34. Hereinafter, each of the effects will be explained.

Firstly, "a reduction effect of a flow velocity (an amount of a flow)" at the bottom flow inhibition concave portion 34 will be explained. As described above, the bottom flow 25 is passed through a fit gap which exists between a side surface and a bottom surface of the flow detecting element 6 and the plate installing portion 15, and the bottom flow 25 is flowed and inputted to the cavity 21. Because the fit gap between the flow detecting element 6 and the plate installing portion 15 is small, the bottom flow 25 is condensed and flowed and a flow velocity of the bottom flow 25 is increased, so that the bottom flow 25, which has a high flow velocity, is flowed and inputted to the cavity 21. When the flow velocity of the bottom flow 25 is high, the amount of the heat which is lost from the flow detecting portion 18 is increased, so that an influence for detection accuracy is increased. Therefore, if the flow velocity of the bottom flow 25 can be lowered, an influence of the bottom flow 25 can be reduced.

Figure 16:
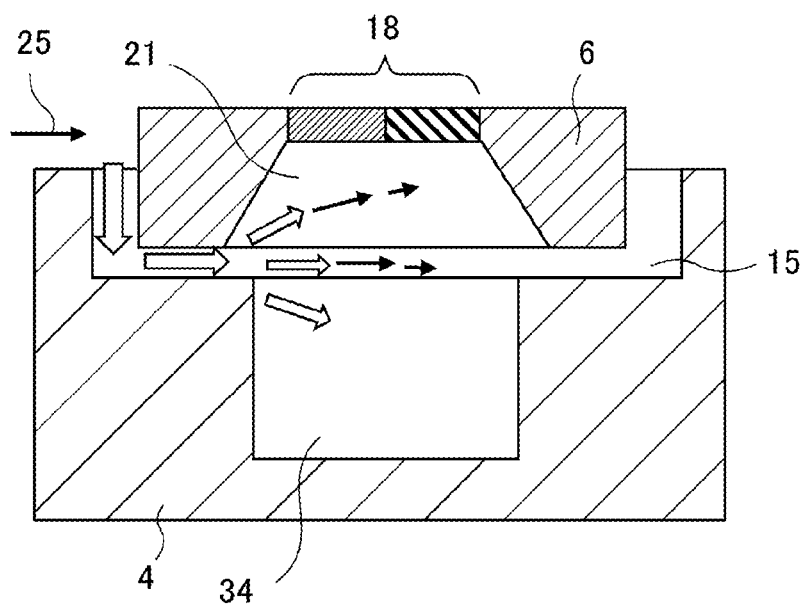
FIG. 16 is a view for explaining a bottom flow inhibition effect of the flow measuring device according to Embodiment 1 of the present invention.

FIG. 16 indicates, by using arrows, a locus and a flow velocity of the bottom flow 25 which is flowed and inputted to the plate installing portion 15 of the plate 4 in which the bottom flow inhibition concave portion 34 is disposed, and it is indicated that the flow velocity is increased while a width of each of the arrows is expanded. When the bottom flow inhibition concave portion 34 is disposed, a cross-sectional area of a passage, in which the bottom flow 25 is passed, is expanded at the cavity 21 because the bottom flow inhibition concave portion 34 exists, so that the flow velocity of the bottom flow 25 can be reduced at an upstream stage with respect to the flow detecting portion 18, and an influence of the bottom flow 25 can be inhibited.

Figure 17:
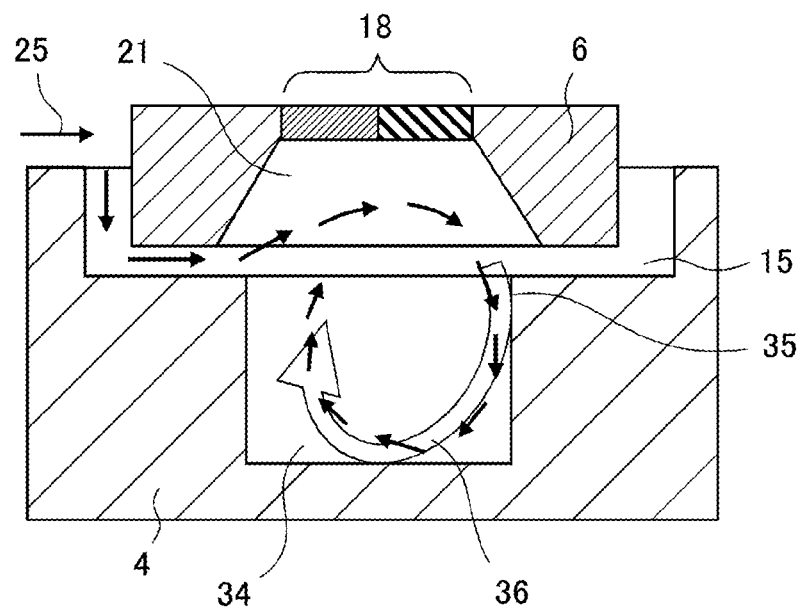
FIG. 17 is a view for explaining a bottom flow inhibition effect of the flow measuring device according to Embodiment 1 of the present invention.

Hereinafter, "a control effect of a flow direction of a bottom flow" at the bottom flow inhibition concave portion 34 will be explained. FIG. 17 indicates, by using arrows, a locus of the bottom flow 25 which is flowed and inputted to the plate installing portion 15 of the plate 4, in which the bottom flow inhibition concave portion 34 is disposed. The bottom flow 25, which is flowed and inputted to the cavity 21, is smashed to a downstream-side wall surface 35 of the bottom flow inhibition concave portion 34, whereby a flow, which is faced to a bottom surface direction of the bottom flow inhibition concave portion 34, is formed. The above-described flow is developed, whereby an eddy 36, which is circulated in the bottom flow inhibition concave portion 34, is formed. As a result, the bottom flow 25 is guided by a flow of the eddy 36 which is circulated, and the bottom flow 25 is flowed to the bottom surface direction of the bottom flow inhibition concave portion 34. The bottom flow 25 is flowed to a direction where the bottom flow 25 is moved away from the flow detecting portion 18, so that the bottom flow 25 is not flowed on the flow detecting portion 18, whereby, in addition to an effect which is described in an explanation for FIG. 16, an influence of the bottom flow 25 can be more inhibited.

Figure 18:
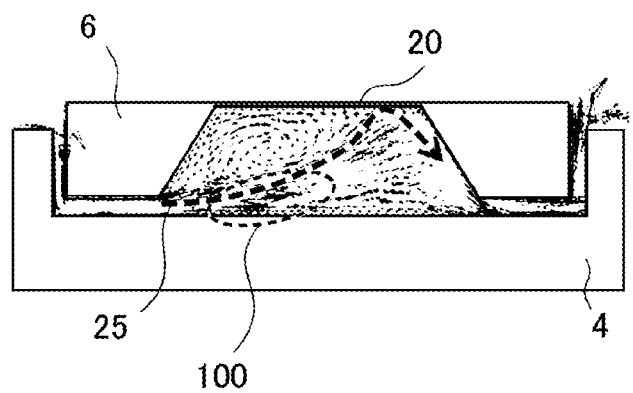
FIG. 18 is a flow velocity contour view at a neighborhood of a flow measuring device according to a conventional art, which is compared with the flow measuring device according to Embodiment 1 of the present invention.

FIG. 18 is a flow velocity contour view, which is obtained by the CAE analysis, when the bottom flow 25 is flowed and inputted to the cavity 21, in the flow measuring device according to Embodiment 1 of the present invention.

Figure 19:
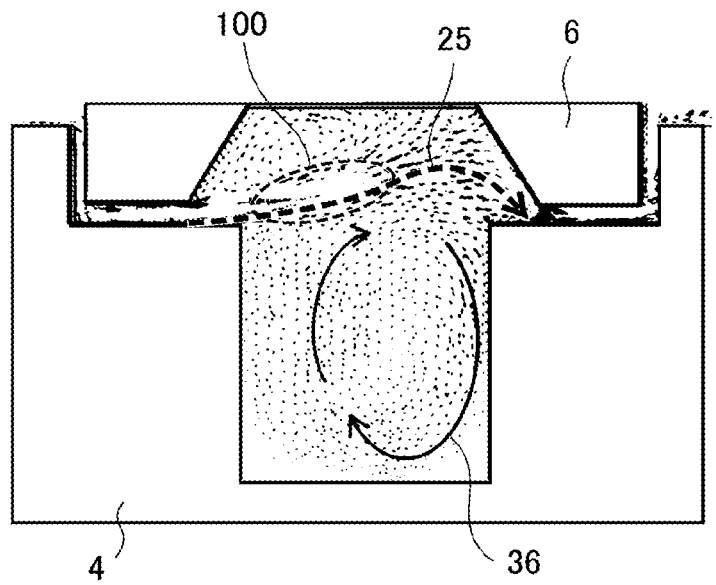
FIG. 19 is a flow velocity contour view at a neighborhood of the flow measuring device according to Embodiment 1 of the present invention.

In FIG. 18 and FIG. 19, an area, which indicates a dense portion, indicates that a value of an air flow velocity is high. Moreover, FIG. 18 indicates an analysis result of a shape in which the bottom flow inhibition concave portion 34 is not provided, and FIG. 19 indicates an analysis result of a shape in which the bottom flow inhibition concave portion 34 is provided.

In FIG. 18, a flow velocity of the bottom flow 25 is high at an area 100 in the cavity 21, and the bottom flow 25 is flowed to a direction in a state where the bottom flow 25 is faced to the downstream-side flow detecting resistor 20, so that the bottom flow 25 is flowed on the downstream-side flow detecting resistor 20. On the other hand, in FIG. 19 in which the bottom flow inhibition concave portion 34 is provide, a flow velocity is suppressed in an area 100 in accordance with the reduction effect of the flow velocity at the bottom flow inhibition concave portion 34 which is described above, moreover, it is recognized that a rectification is performed, in accordance with an effect of the eddy 36 which is caused and circulated in the bottom flow inhibition concave portion 34, in such way that a flow direction of the bottom flow 25 is not faced to the downstream-side flow detecting resistor 20.

As described above, in the flow measuring device according to Embodiment 1, even when the bottom flow 25 is caused, the reduction effect of the flow velocity value of the bottom flow 25 and a rectification effect are acted in accordance with an effect at the bottom flow inhibition concave portion 34, so that the flow measuring device can be configured in which an output abnormality, which is caused by the bottom flow 25, can be prevented.

Embodiment 2

In Embodiment 2, a flow measuring device, which can more prevent a reduction of detection accuracy, which is caused by a bottom flow, in comparison with the above-described flow measuring device according to Embodiment 1, will be explained.

Figure 20:
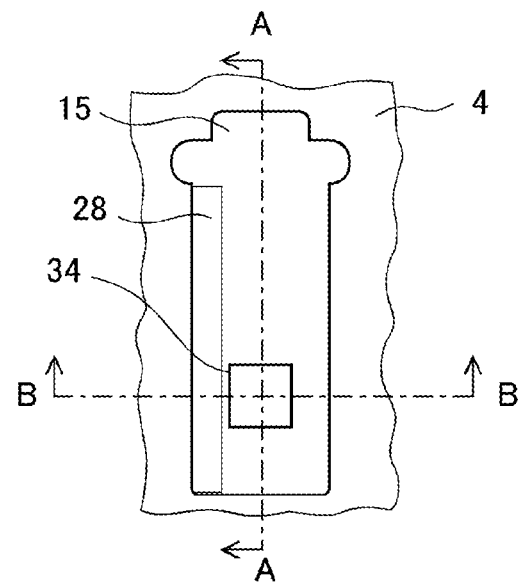
FIG. 20 is a front view which indicates an installing portion which is provided at a plate of a flow measuring device according to Embodiment 2 of the present invention.
Figure 21:
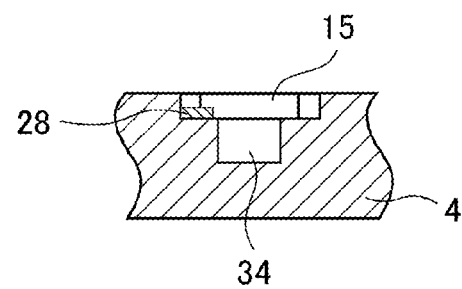
FIG. 21 is a cross-sectional view in which a cross section along "B-B" line in FIG. 20 is indicated.
Figure 22:
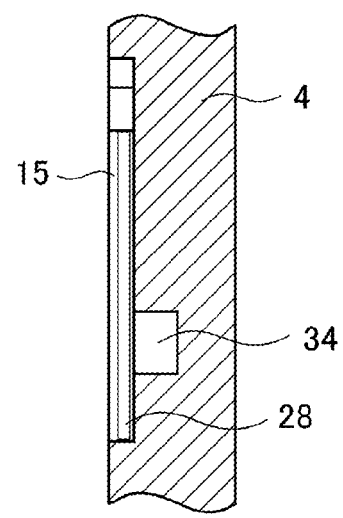
FIG. 22 is a cross-sectional view in which a cross section along "A-A" line in FIG. 20 is indicated.
Figure 23:
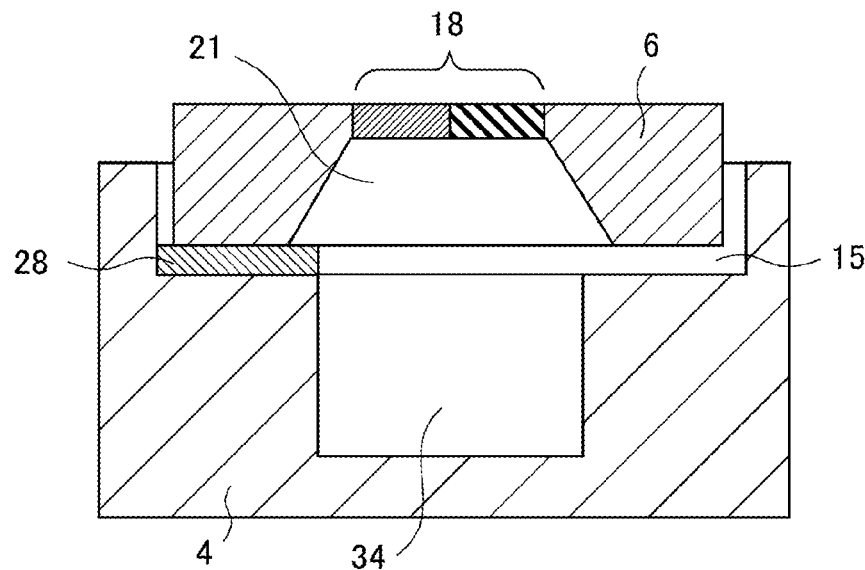
FIG. 23 is a cross-sectional view which indicates a cross section of the flow detecting portion of the flow measuring device according to Embodiment 1 of the present invention.

FIG. 20 is a front view which indicates an installing portion 15 which is provided at a plate 4 of the flow measuring device according to Embodiment 2. Moreover, FIG. 21 is a cross-sectional view in which a cross section along "B-B" line in FIG. 20 is indicated, and FIG. 22 is a cross-sectional view in which a cross section along "A-A" line in FIG. 20 is indicated.

In the flow measuring device according to Embodiment 2, the flow measuring device has a configuration in which a bottom flow inhibitor 28 is coated on the installing portion 15 of the plate 4. In addition, the other configurations according to Embodiment 2 are similar to the configurations according to Embodiment 1, so that an explanation is omitted.

In the flow measuring device according to Embodiment 2, a fit gap between a flow detecting element 6 and the installing portion 15 of the plate 4 is filled by using the bottom flow inhibitor 28, so that an inflow of a bottom flow can be prevented. Moreover, when the bottom flow is flowed and inputted from an area, at which the coating of the bottom flow inhibitor 28 is interrupted, which is described above, or from an area, at which the bottom flow inhibitor 28 is not coated, an influence of the bottom flow can be inhibited in accordance with the effect at the bottom flow inhibition concave portion 34, which is described in Embodiment 1.

Figure 24:
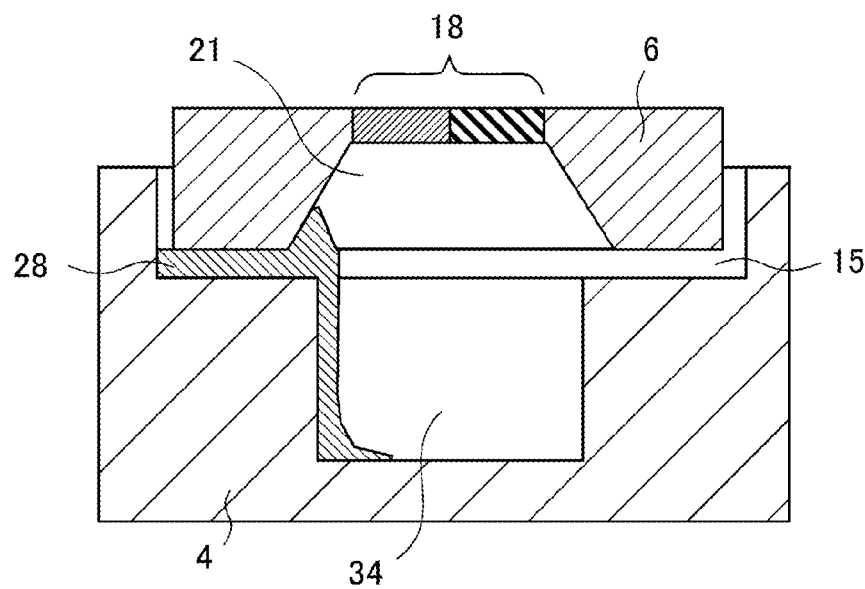
FIG. 24 is a view for explaining an effect of the flow measuring device according to Embodiment 2 of the present invention.

Moreover, because the bottom flow inhibition concave portion 34 is disposed, even when a coating of the bottom flow inhibitor 28 is performed in an excessive amount state, the bottom flow inhibitor 28 is flowed in the bottom flow inhibition concave portion 34 as illustrated in FIG. 24, so that the rising operation of the bottom flow inhibitor 28, which is described above, to the flow detecting portion 18 can be suppressed. Therefore, a coating capability of the bottom flow inhibitor 28 can be improved in comparison with a conventional bottom flow inhibitor to which a countermeasure is performed.

As described above, in the flow measuring device according to Embodiment 2, the flow measuring device can be configured in which an inflow of a bottom flow can be prevented, and bottom flow inhibitor 28 can be more easily coated.

Embodiment 3

In Embodiment 3, a flow measuring device, which can more prevent a reduction of detection accuracy, which is caused by a bottom flow, in comparison with the above-described flow measuring device according to Embodiment 1, will be explained.

Figure 25:
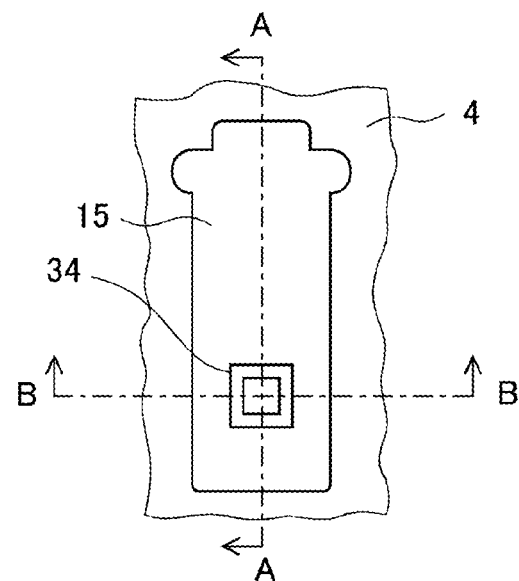
FIG. 25 is a front view which indicates an installing portion which is provided at a plate of a flow measuring device according to Embodiment 3 of the present invention.
Figure 26:
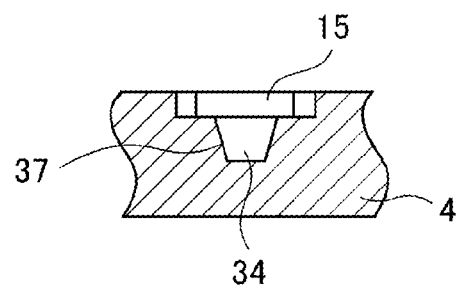
FIG. 26 is a cross-sectional view in which a cross section along "B-B" line in FIG. 25 is indicated.
Figure 27:
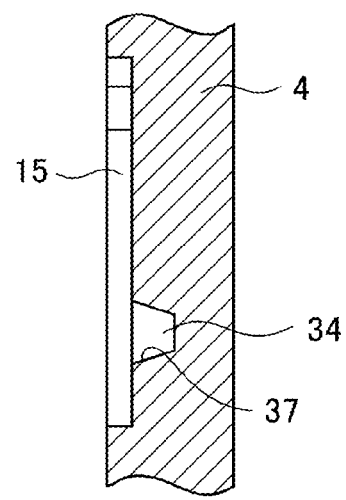
FIG. 27 is a cross-sectional view in which a cross section along "A-A" line in FIG. 25 is indicated.

FIG. 25 is a front view which indicates an installing portion 15 which is provided at a plate 4 of the flow measuring device according to Embodiment 3. Moreover, FIG. 26 is a cross-sectional view in which a cross section along "B-B" line in FIG. 25 is indicated, and FIG. 27 is a cross-sectional view in which a cross section along "A-A" line in FIG. 25 is indicated.

In the flow measuring device according to Embodiment 3, in a bottom flow inhibition concave portion 34 which is compared with the bottom flow inhibition concave portion 34 according to Embodiment 1, a taper 37, which is gradually narrowed toward a bottom surface direction of the bottom flow inhibition concave portion 34, is provided. In other words, at the bottom flow inhibition concave portion 34, the taper 37, which is narrowed in such a way that a cross-sectional area is gradually reduced toward the bottom surface direction of the bottom flow inhibition concave portion 34, is provided. In addition, the other configurations according to Embodiment 3 are similar to the configurations according to Embodiment 1, so that an explanation is omitted. Moreover, it is suitable that the configurations according to Embodiment 3 are combined to the configurations according to Embodiment 2.

In the flow measuring device according to Embodiment 3, the taper 37 is added to the bottom flow inhibition concave portion 34, whereby a flow direction of an eddy, which is caused in the bottom flow inhibition concave portion 34, is changed to a direction which is faced to a bottom flow, and the eddy and the bottom flow are joined, whereby a flow velocity of the bottom flow can be more lowered.

Figure 28:
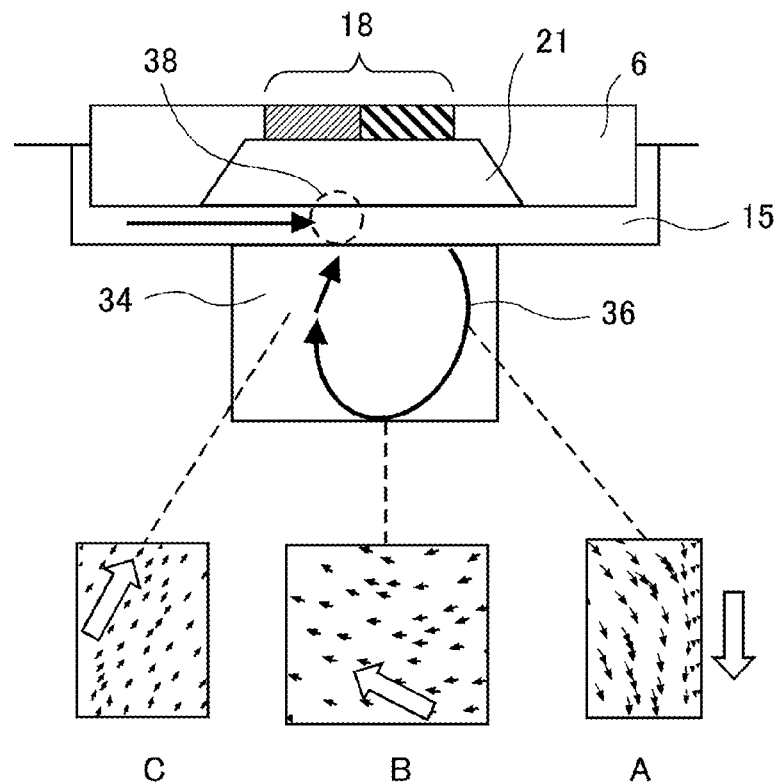
FIG. 28 is a view for explaining a locus of a cyclic eddy which is caused at a bottom flow inhibition concave portion of the flow measuring device according to Embodiment 1 of the present invention.
Figure 29:
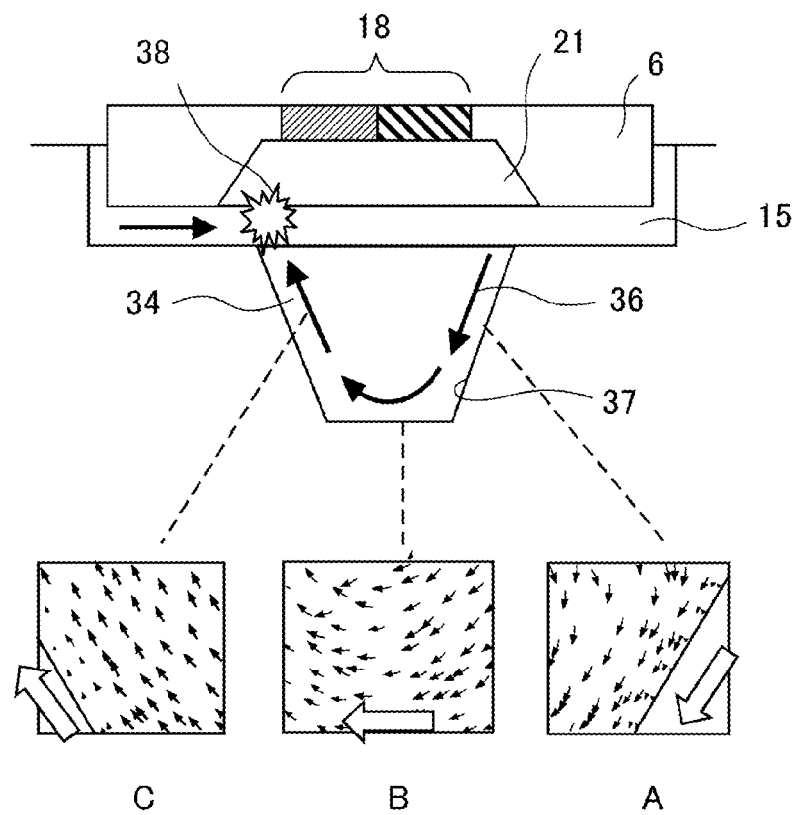
FIG. 29 is a view for explaining a locus of a cyclic eddy which is caused at a bottom flow inhibition concave portion of the flow measuring device according to Embodiment 3 of the present invention.

FIG. 28 indicates a locus of the eddy 36 which is caused at the bottom flow inhibition concave portion 34 according to Embodiment 1, and FIG. 29 indicates a locus of an eddy 36 which is caused at the bottom flow inhibition concave portion 34 according to Embodiment 3. Moreover, an "A" portion through a "C" portion indicate flow directions, which are obtained by the CAE analysis, of the bottom flow of each of wall surface neighborhoods at the bottom flow inhibition concave portion 34, and each of the portions are indicated as the following description.

The "A" portion: a downstream-side wall surface neighborhood, the "B" portion: a bottom surface neighborhood, the "C" portion: an upstream-side wall surface neighborhood.

Hereinafter, an effect of the flow measuring device according to Embodiment 3 will be explained by using the above-described two figures.

The locus of the eddy 36, which is caused at the bottom flow inhibition concave portion 34 which is indicated in Embodiment 1, has a component, in a bottom surface direction of the bottom flow inhibition concave portion 34, at the "A" portion in FIG. 28, and has a component, in a direction which is faced from a downstream to an upstream, at the "B" portion, and has two components, in a upper surface direction of the bottom flow inhibition concave portion 34 and in a direction of the bottom flow 25, at the "C" portion. In this case, a flow of the eddy 36 at the "C" portion has a component of which direction is identical to a direction of the bottom flow 25, so that a confluence loss of the eddy 36 and the bottom flow is small at a confluence portion 38 for the bottom flow 25. On the other hand, at a locus in the bottom flow inhibition concave portion 34 which is indicated in Embodiment 3, the eddy 36 is flowed in a direction along the taper 37 from the "A" portion to the "C" portion. A flow direction of the eddy 36 at the "C" portion has a component which is faced to the bottom flow 25, so that a confluence loss is greatly caused at the confluence portion 38 for the bottom flow 25, and a flow velocity of the bottom flow 25 can be reduced.

As described above, in the flow measuring device according to Embodiment 3, a flow direction of the eddy 36, which is caused in the bottom flow inhibition concave portion 34, is controlled, whereby the flow measuring device can be configured in which the reduction of the detection accuracy, which is caused by the bottom flow 25, can be more prevented.

Embodiment 4

In Embodiment 4, a flow measuring device, which can more prevent a reduction of detection accuracy, which is caused by a bottom flow, in comparison with the above-described flow measuring device according to Embodiment 1, will be explained.

Figure 30:
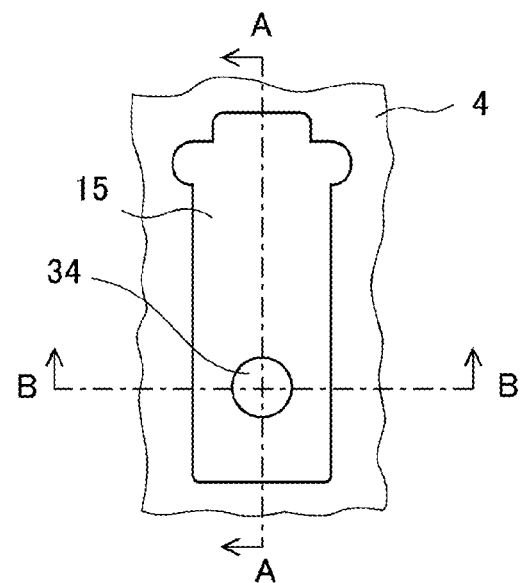
FIG. 30 is a front view which indicates an installing portion which is provided at a plate of a flow measuring device according to Embodiment 4 of the present invention.
Figure 31:
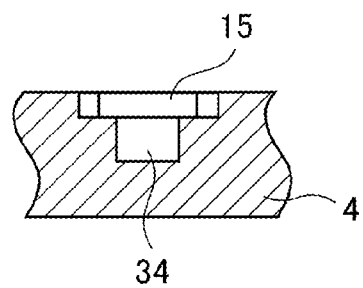
FIG. 31 is a cross-sectional view in which a cross section along "B-B" line in FIG. 30 is indicated.
Figure 32:
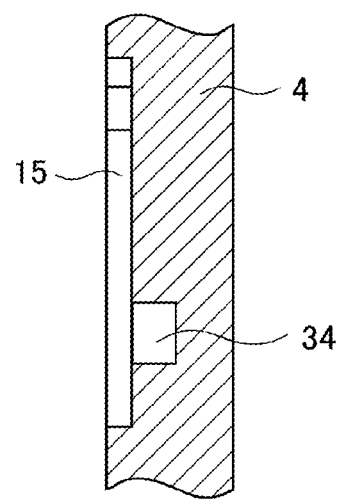
FIG. 32 is a cross-sectional view in which a cross section along "A-A" line in FIG. 30 is indicated.

FIG. 30 through FIG. 32 indicates a shape of an installing portion 15 of a plate 4 in the flow measuring device according to Embodiment 4. FIG. 30 is a front view which indicates the installing portion 15 which is provided at the plate 4, and FIG. 31 is a cross-sectional view in which a cross section along "B-B" line in FIG. 30 is indicated, and FIG. 32 is a cross-sectional view in which a cross section along "A-A" line in FIG. 30 is indicated.

In the flow measuring device according to Embodiment 4, the flow measuring device has a characteristic in which a plane shape of a bottom flow inhibition concave portion 34 is formed as a circular shape with respect to the bottom flow inhibition concave portion 34 according to Embodiment 1. In addition, the other configurations according to Embodiment 4 are similar to the configurations according to Embodiment 1, so that an explanation is omitted. Moreover, it is suitable that the configurations according to Embodiment 4 are combined to the configurations according to Embodiment 2 through Embodiment 3.

Figure 33:
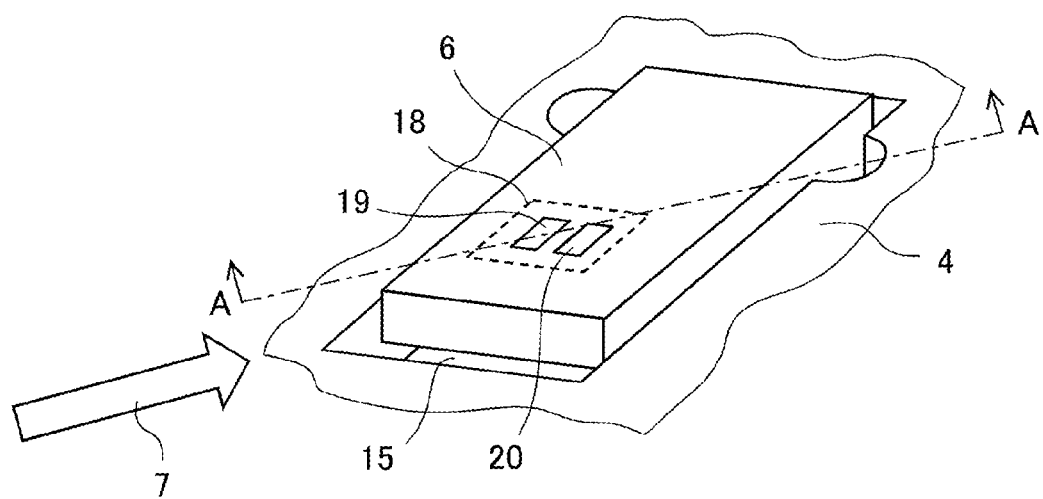
FIG. 33 is an oblique perspective view for explaining a problem which is caused at the flow measuring device according to Embodiment 1 of the present invention when a drift is caused.
Figure 34:
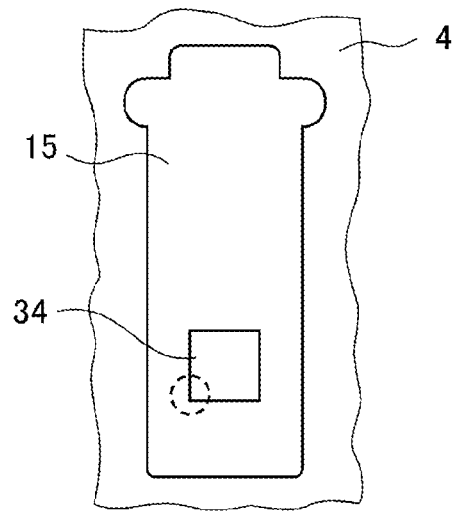
FIG. 34 is a front view which indicates a front of an installing portion which is provided at a plate in FIG. 33.
Figure 35:
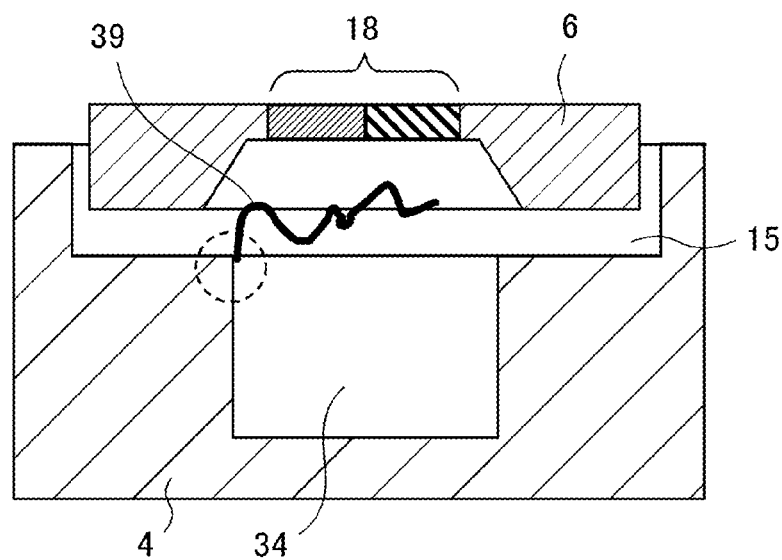
FIG. 35 is a schematic cross-sectional view in which a cross section along "A-A" line in FIG. 33 is indicated.

There is case in which a flow direction of an inhalation air 7, which is faced to a flow detecting element 6, is unevenly flowed in accordance with a shape of an intake air pipeline 1 or a shape of a bypass passage 8, and as indicated in, for example, FIG. 33 through FIG. 35, an inflow angle of the inhalation air 7 to the installing portion 15 of the plate 4 is varied in such a way that the inhalation air 7 is flowed from a tip side of the installing portion 15 of the plate 4 to a downstream side. In this case, in a similar way of the flow measuring device according to Embodiment 1, when a corner portion (refer to a broken line circular portion) is provided at the bottom flow inhibition concave portion 34 as illustrated in FIG. 34 and FIG. 35, and the inhalation air 7 is flowed and inputted from the corner portion, a fluctuation 39 of a flow of the bottom flow is caused at the corner portion, and the flow is varied to an unstable flow, whereby there is a possibility in which the above-described effect is not sufficiently obtained. On the other hand, when a plane shape of the bottom flow inhibition concave portion 34 is formed as a circular shape, a corner portion is not provided, so that the above-described fluctuation 39 is not caused, and an effect of the bottom flow inhibition concave portion 34 can be exerted regardless of an intrusion angle of the inhalation air 7.

As described above, in the flow measuring device according to Embodiment 4, the bottom flow inhibition concave portion 34, which has not a corner portion, is disposed, whereby the flow measuring device can be configured in which the reduction of the detection accuracy, which is caused by the bottom flow, can be more prevented.

Embodiment 5

In Embodiment 5, a flow measuring device, which can more prevent a reduction of detection accuracy which is caused by a bottom flow, in comparison with the above-described flow measuring device according to Embodiment 1, will be explained.

Figure 36:
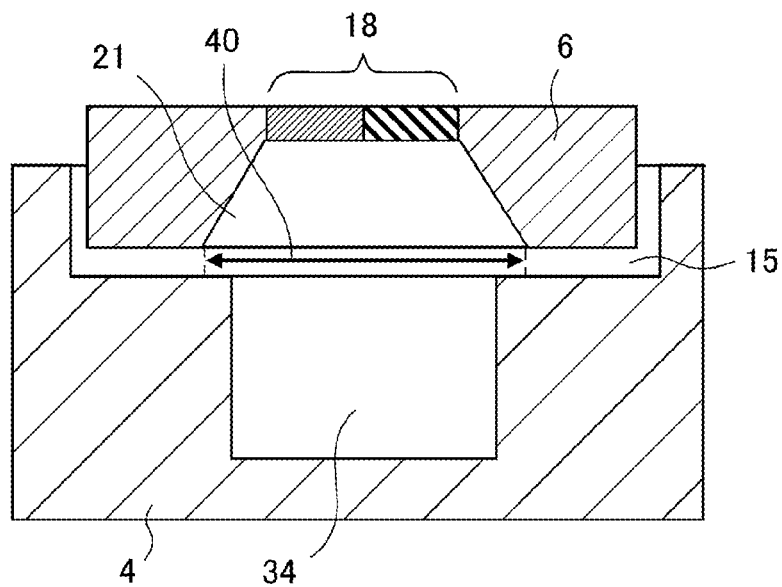
FIG. 36 is a cross-sectional view which indicates a flow detecting element portion of a flow measuring device according to Embodiment 5 of the present invention.

FIG. 36 indicates a cross-sectional area shape of an installing portion 15 of a plate 4 and a bottom flow inhibition concave portion 34 in the flow measuring device according to Embodiment 5.

In the flow measuring device according to Embodiment 5, the flow measuring device has a characteristic in which a setting area of the bottom flow inhibition concave portion 34 is limited to the inside of a projected surface 40 of a cavity 21, which is positioned directly below a flow detecting portion 18, with respect to the bottom flow inhibition concave portion 34 according to Embodiment 1. In addition, the other configurations according to Embodiment 4 are similar to the configurations according to Embodiment 1, so that an explanation is omitted. Moreover, it is suitable that the configurations according to Embodiment 5 are combined to the configurations according to Embodiment 2 through Embodiment 4.

Figure 37:
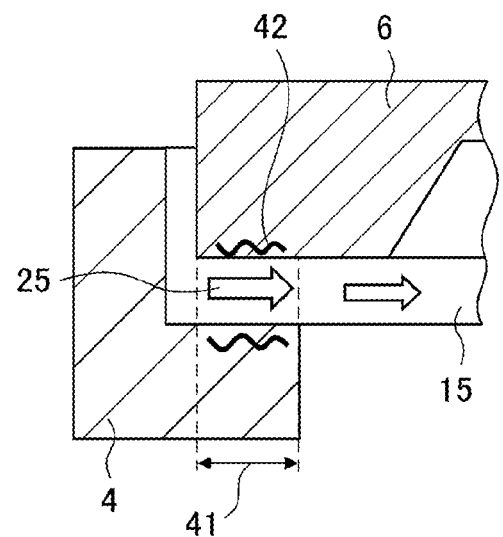
FIG. 37 is a view for explaining a reason for limiting a setting area of the bottom flow inhibition concave portion of the flow measuring device according to Embodiment 1 of the present invention.
Figure 38:
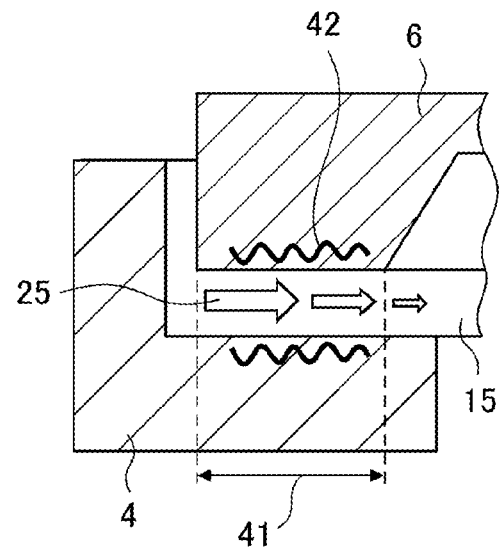
FIG. 38 is a view for explaining a reason for limiting a setting area of the bottom flow inhibition concave portion of the flow measuring device according to Embodiment 1 of the present invention.

In the flow measuring device according to Embodiment 5 of the present invention, although the setting area of the bottom flow inhibition concave portion 34 is limited to the inside of the projected surface 40 of the cavity 21, which is positioned directly below the flow detecting portion 18, so as to be provided, the setting area is limited so as to be provided in order to reduce a flow of the bottom flow 25 which is flowed and inputted to the cavity 21. FIG. 37 and FIG. 38 are views for explaining a reason for limiting a setting area of the bottom flow inhibition concave portion 34 in FIG. 36, and FIG. 37 and FIG. 38 are cross-sectional views of a main portion which indicates a relation between the projected surface 40 of the cavity 21 and the bottom flow inhibition concave portion 34. FIG. 37 is a cross-sectional view of a main portion, which indicates a configuration in which the bottom flow inhibition concave portion 34 is provided at an area which are larger than the inside of the projected surface 40 of the cavity 21, and FIG. 38 is a cross-sectional view of a main portion of the flow detecting portion 18, which indicates the flow measuring device according to Embodiment 5 of the present invention, in which the bottom flow inhibition concave portion 34 is provided in the projected surface 40 of the cavity 21. The bottom flow 25 is not easily flowed while a pressure loss, which is caused between fit surfaces 41 of a thick film portion of a flow detecting element 6 and the installing portion 15, is increased, so that an amount of an inflow to the cavity 21 is reduced. Moreover, a flow velocity of the bottom flow 25 is reduced in accordance with a friction loss 42 which is caused at a wall surface of the flow detecting element 6 and a wall surface of the installing portion 15 of the plate 4. A shape of an area of the fit surfaces 41 in FIG. 38 is large in comparison with a shape of an area of the fit surfaces 41 in FIG. 37, so that the above-described effect can be sufficiently obtained, and the amount of the inflow and the flow velocity of the bottom flow 25 can be lowered.

As described above, in the flow measuring device according to Embodiment 5, the setting area of the bottom flow inhibition concave portion 34 is limited to an area on the projected surface 40 of the cavity 21, which is positioned directly below the flow detecting portion 18, whereby the flow measuring device can be configured in which the reduction of the detection accuracy, which is caused by the bottom flow, can be more prevented.

Embodiment 6

In Embodiment 6, a flow measuring device, which can more prevent an output abnormality which is caused by a bottom flow, in comparison with the above-described flow measuring device according to Embodiment 1, will be explained.

In the flow measuring device according to Embodiment 6, a starting point of the bottom flow inhibition concave portion, which is indicated in the flow measuring device according to Embodiment 1, is provided in a projected surface of an inclination which connects a thick film portion of a flow detecting element and a thin-walled portion, and a bottom flow inhibition concave portion, at which a volume ratio between a bottom flow inhibition concave portion and a cavity is greater than or equal to 0.7, is provided.

Figure 39:
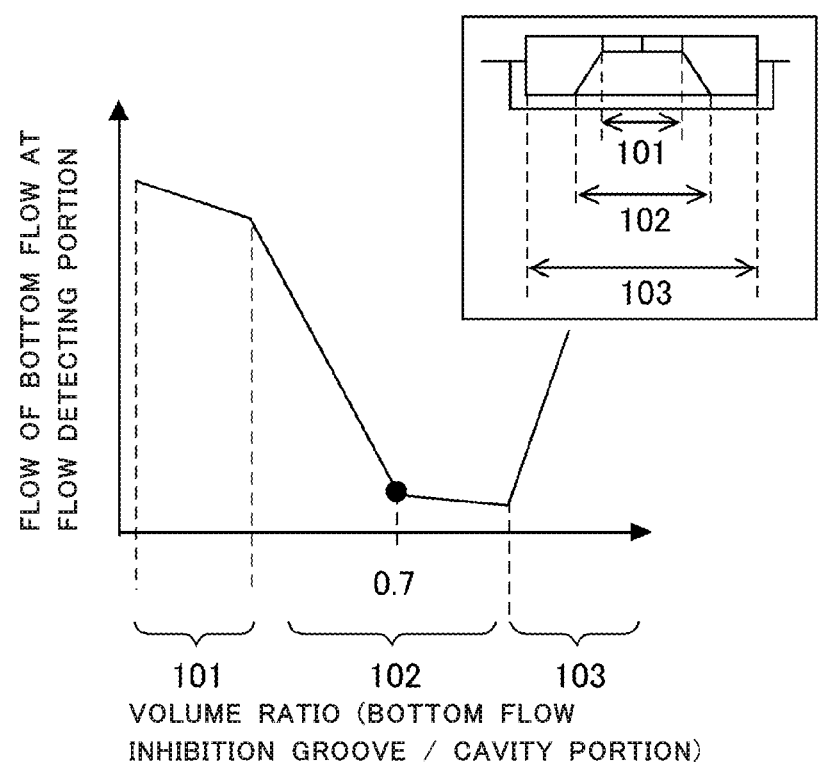
FIG. 39 is a view for explaining a relation among the bottom flow inhibition concave portion, a volume of the cavity, and a flow of the bottom flow.

FIG. 39 is characteristic view which indicates a relation with the volume ratio between the bottom flow inhibition concave portion and the cavity and with a flow of the bottom flow, when a volume of the bottom flow inhibition concave portion is expanded to a width direction. Moreover, an area is separated to an area 101 through an area 103 so as to be indicated in accordance with the starting point of the bottom flow inhibition concave portion, and each of the areas is indicated in the following descriptions.

The area 101: the bottom flow inhibition concave portion is set in a projected surface of a flow detecting portion 18.

The area 102: the bottom flow inhibition concave portion is set in a projected surface of the inclination which connects the thick film portion of the flow detecting element and the thin-walled portion.

The area 103: the bottom flow inhibition concave portion is set in a projected surface of all area of the flow detecting element.

Although there is a tendency in which a flow is reduced while a volume ratio is increased, a reduction extent at the area 101 is different from a reduction extent at the area 102. A starting point of the bottom flow inhibition concave portion is closed to a neighborhood of the flow detecting portion 18 at the area 101, so that a flow velocity of the bottom flow is not reduced till the neighborhood of the flow detecting portion 18, and a capacity of the bottom flow inhibition concave portion is also small, so that the above-described effect in the flow measuring device according to Embodiment 1 is not sufficiently obtained. On the other hand, when the starting point of the bottom flow inhibition concave portion is disposed at the area 102, the above-described effect in the flow measuring device according to Embodiment 1 can be sufficiently obtained. A flow velocity of the bottom flow can be greatly reduced when a volume ratio is lower than 0.7, and the effect becomes a saturation tendency. Moreover, although a flow of the bottom flow is monotonously increased at the area 103, the bottom flow is monotonously increased because an amount of an inflow and the flow velocity of the bottom flow are increased by a mechanism which is explained in Embodiment 5.

As described above, in the flow measuring device according to Embodiment 6, the starting point of the bottom flow inhibition concave portion is disposed at the projected surface of the inclination which connects the thick film portion of the flow detecting element and the thin-walled portion, and it is set that the volume ratio is greater than or equal to 0.7, whereby the flow measuring device can be configured in which a reduction of detection accuracy which is caused by the bottom flow, can be more prevented. As described above, the flow measuring device according to Embodiment 6 has a characteristic in which the starting point of the bottom flow inhibition concave portion of the supporting component is disposed in the projected surface of the inclination which connects the thin-walled portion of the flow detecting element and a portion which is excepted from the thin-walled portion, and a ratio between a volume of the bottom flow inhibition concave portion of the supporting component and a volume of the cavity of the flow detecting element is greater than or equal to 0.7.

In the present invention, in the scope of the present invention, is possible that each of embodiments is freely combined, or each of embodiments is suitably modified or omitted.

What is claimed is:

1. A flow measuring device comprising:
   a flow detecting element in which flow detecting resistors are formed on a surface of a base material, and a thin-walled portion, at which a cavity portion is formed at a lower portion of the flow detecting resistors in such a way that the base material is partly removed, is included, and the thin-walled portion is formed as a flow detecting portion; and
   a supporting component which includes an installing portion having a first concave portion, on which the flow detecting element is mounted, and is provided at a passage in which a measured fluid is flowed; wherein
   a second concave portion, which inhibits a bottom flow which is flowed and inputted from a gap between fit surfaces of the installing portion of the supporting component and the flow detecting element, which are fitted and arranged, is provided at a bottom surface of the installing portion of the supporting component, which is faced to the cavity portion of the flow detecting element, and
   wherein an upstream edge of the cavity portion in a direction of fluid flow is positioned farther upstream than an upstream edge of the second concave portion in the direction of fluid flow.

2. A flow measuring device as recited in claim 1, wherein an adhesive is coated around the flow detecting portion in such a way that the fit surfaces of the installing portion and the flow detecting element are filled with the adhesive.

3. A flow measuring device as recited in claim 1, wherein a taper, which is narrowed in such a way that a cross-sectional area is gradually reduced toward a bottom surface direction of the second concave portion, is provided at the second concave portion of the supporting component.

4. A flow measuring device as recited in claim 1, wherein a plane shape of the second concave portion of the supporting component is formed as a circular shape.

5. A flow measuring device as recited in claim 1, wherein the second concave portion of the supporting component is provided in a projected surface of the cavity portion which is positioned directly below the flow detecting portion.

6. A flow measuring device as recited in claim 1, wherein a starting point of the second concave portion of the supporting component is provided in a projected surface of an inclination which connects the thin-walled portion of the flow detecting element and a portion which is excepted from the thin-walled portion of the flow detecting element, and a ratio between a volume of the second concave portion of the supporting component and a volume of the cavity portion of the flow detecting element is greater than or equal to 0.7.

7. A flow measuring device as recited in claim 1, wherein a downstream edge of the cavity portion in a direction of fluid flow is positioned farther downstream than a downstream edge of the second concave portion in the direction of fluid flow.

* * * * *